F. P. ROOT.
AIR VALVE FOR PNEUMATIC TIRES.
APPLICATION FILED SEPT. 12, 1912.
1,104,074.
Patented July 21, 1914.
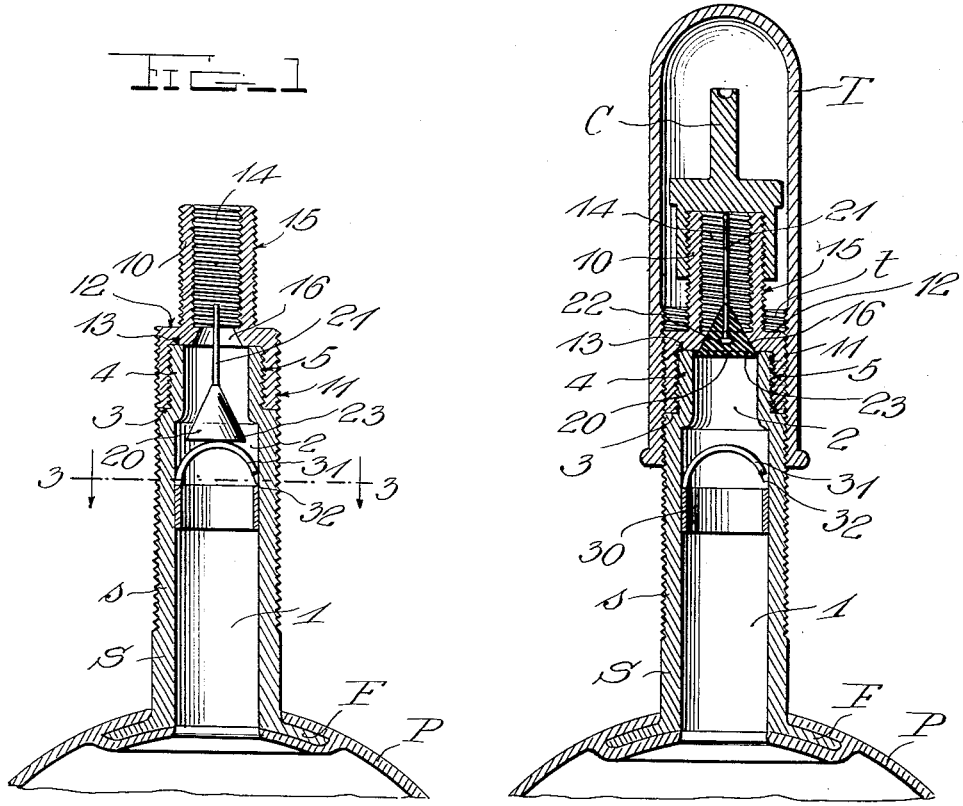
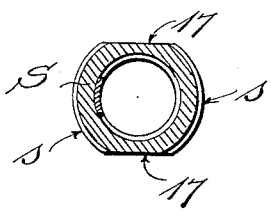
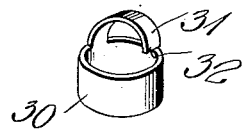
Witnesses
Inventor
Frank P. Root
By H. B. Willson & Co.
Attorneys

UNITED STATES PATENT OFFICE.

FRANK P. ROOT, OF AKRON, OHIO.

AIR-VALVE FOR PNEUMATIC TIRES.

1,104,074.   Specification of Letters Patent.   Patented July 21, 1914.

Application filed September 12, 1912. Serial No. 720,029.

*To all whom it may concern:*

Be it known that I, FRANK P. ROOT, a citizen of the United States, residing at Akron, in the county of Summit and State of Ohio, have invented certain new and useful Improvements in Air-Valves for Pneumatic Tires; and I do declare the following to be a full, clear, and exact description of the invention, such as will enable others skilled in the art to which it appertains to make and use the same.

This invention relates to pneumatic tires, and more especially to the air valves therefor; and the objects of the same are to form the stem of such a valve in two parts so that the valve itself can be removed when it is worn, to connect these parts by a screw-threaded joint closed by the valve itself when under air pressure, to provide for holding the two parts against unscrewing by means of the ordinary thimble, and to provide a stop for preventing the loss of the valve into the interior of the pneumatic tube.

These objects are accomplished by constructing the device in the manner hereinafter more fully described and claimed, and as shown in the drawings wherein—

Figure 1 is a central vertical sectional view of the device with the valve unseated, and Fig. 2 is a similar section with the valve seated and the cap and thimble added to show the relative location of parts when the tire is in use. Fig. 3 is a cross section on the line 3—3 of Fig. 1, and Fig. 4 is a perspective detail of the stop.

In the drawings the letter P designates a pneumatic tube, and the letter S designates the stem of an air valve fastened into the tube as at F and externally threaded as at *s*; the letter C designates the cap ordinarily employed for closing the outer end of the stem after the valve has been inflated, and T is the thimble which incloses the cap and screws onto the stem itself, for which purpose the thimble is internally threaded as at *t*. No novelty is claimed for the parts thus far described.

Coming now to the details of the present invention, the stem has at its inner portion a smooth cylindrical bore 1 reduced at its outer end as at 2, and its body is externally shouldered near its outer end as at 3 about opposite the point where the bore is reduced, beyond which it is extended in a nipple 4 externally threaded as at 5. What might be called the outer portion or section of the stem S is a second tubular member 10 whose inner end is internally threaded to fit upon the threads 5 and externally threaded as at 11 to match the threads *s*, whose inner extremity is flat so as to rest upon the shoulder 3, whose body is internally shouldered as at 13 to rest upon the flat extremity of the inner section S and correspondingly externally shouldered as at 12, and whose outer end beyond the shoulders 12 and 13 is reduced in size and internally threaded as at 14 and externally threaded as at 15 so that an air pump having a male or a female thread in its coupling may be attached for the purpose of inflating the tire. Thus is produced a member which is practically an extension of the stem S with a bell-mouth at its inner end screwed onto the reduced nipple 4 at the outer end of said stem, and on its interior at about its mid-length is formed a conical valve seat 16 whose larger end is preferably smaller than the bore 2 of the nipple 4. The parts thus far described are entirely of metal—preferably brass. The ordinary cap C screws onto the external thread 15 at the outer end of said member 10; and when the entire valve is in place and the tire is ready to be used, both said cap C and the outer member are covered by a thimble T whose internal threads *t* engage the exterior threads 11 on the member 10 and the exterior threads *s* on the body of the stem itself, and therefore hold all parts in place against disconnection. I would here remark that the opposite sides of the stem S and of the larger portion of the member 10 are flattened as at 17 in Fig. 3, so that when these two parts are to be disconnected a wrench can be applied to each.

The valve has a head 20 formed of soft rubber in the shape of a cone, and an upstanding metallic stem 21 rising from its apex and embedded along its axis, the stem itself preferably having a head 22 at its lower end so that it cannot become displaced from the rubber head 20. It is important that the taper of the sides of said head 20 shall be such that they will fit the taper of the seat 16 very closely, and also it is important that the circumference of the large end 23 of the head 20 shall be slightly greater than the circumference of the large end of said seat 16 and of a size to fit slidably in the reduced bore 2 within the stem. It is important also that the length of the stem shall be such that the following action will take place.

With all parts connected and standing as seen in Fig. 2, the air pressure within the tube P forces the head 20 outward into the seat 16 and closes the valve, though air beyond its larger end will yet escape through the joint between the shoulder 13 of the outer member 10 and the outer end of the nipple 4. Continued pressure from within will immediately close this joint, and therefore will prevent the possibility that the air pressure will leak outward under said shoulder and through the threads 5 and escape. When now it is desired to inflate a tire, the thimble and cap are removed as usual, the latter inverted and the little pin at its upper end pushed downward onto the stem 21 so as to unseat the valve, in order to be sure that it does not stick, and a pump applied and air forced into this device. Obviously the inrush of air will carry with it the conical head 20 until the latter passes out of the reduced bore and into the larger bore 1 of the stem S, after which the inward flow of the air through this device will be free. Assuming finally that the operator has pumped more air into the tire than he desires, as proven by the testing machine applied as usual, and it becomes necessary to permit a little air to escape his course would be to press the stem inward for a slight distance until the valve head 20 is unseated from the seat 16 and pushed along for a short distance into the reduced bore 2, and the air within the tire passing outward through the larger bore 1 will then escape slowly around the edges of the valve head 20—rather than rapidly as it would do if the valve were pushed inward to the position shown in Fig. 1. Therefore, the value of reducing the bore of the stem at a point near its outer end becomes apparent For the purpose of preventing the valve from becoming lost in the stem and possibly dropping into the interior of the pneumatic tube P, I provide a stop whose details of construction are best seen in Fig. 4. This is stamped from a sheet of spring metal into a body 30 having the shape of a short section of cylinder, and from one side of the same projects a tongue 31 which is bent over toward the opposite side of the body to the point 32 but preferably not quite in contact with the body at this side. The entire device is pushed into the bore 1 of the stem S from the inner end, but before said stem is fastened as at F into the pneumatic tube P; and it comes to rest at about the point shown in the drawings, but certainly at a point below the shoulder between the two sizes of the bore within said stem. The result is that when the valve is pushed inward to completely open it, its head 20 rests on the tongue 31 and yet there is no interruption to the flow of air in either direction through the bore 1 of the stem.

The advantages resulting from constructing an air valve in this manner are many. When it is desired to repair or clean the interior of the same, a wrench may be placed on the flat faces 17 of the stem S, and another on the similar faces of the member 10 (which faces it will hardly be necessary to illustrate), and by holding one wrench and turning the other the member can be fully removed from the stem and its interior examined, cleaned, and possibly repaired. Meanwhile a suitable tool may be passed through the reduced bore 2 to push the stop 30 downward, or perhaps to hook under its tongue and pull it upward in case it needs adjusting. Meanwhile also the valve itself can be removed, inspected, repaired or replaced. Later the parts are restored to the position shown in the drawings, and by tightening up the member 10 on the member or part S a nearly air-tight joint is formed where they screw together as at 5, and the expansion of the rubber head 20 under air pressure as shown in Fig. 2 effectively and finally seals this joint so that no air can escape.

Thus it will be seen that by the construction of parts hereinbefore described, I have produced a device wherein the valve not only closes against its seat to prevent the escape of air from the pneumatic tube, but it also seals the joint between the two members or parts of the stem and therefore renders it possible to connect said parts by means of an ordinary thread so that they may be disconnected from each other when occasion arises. Furthermore it will be observed that the use of a valve of this kind does not necessitate any change in the cap, the thimble, or the air pump; and of course it may be fastened as at F to any form of pneumatic tube P. The sizes, shapes, proportions, and materials of parts are not absolutely essential as will be clear.

What is claimed as new is:

1. In an air valve for pneumatic tires, the combination with the tubular stem having a valve seat, and an outwardly closing valve therefor; of a stop consisting of a cylindrical body frictionally mounted within the interior of said stem, and a tongue projecting from one side of said body toward the valve and curved over toward the other side of said body.

2. In an air valve for pneumatic tires, the combination with a stem whose bore is shouldered near its outer end and reduced and cylindrical beyond said shoulder, and is provided beyond said reduced portion with a valve seat and beyond the seat in turn with an extension for the pump; of a valve movable within the reduced portion of said bore, a stem projecting from said valve through said extension, and a stop adjustably mounted within the larger portion of said bore.

3. In an air valve for pneumatic tires, the combination with a stem whose bore is shouldered near its outer end and reduced and cylindrical beyond said shoulder, and is provided beyond said reduced portion with a valve seat; of a conical valve whose larger inner end is slidably mounted within the reduced portion of the bore, a stem projecting from its smaller end through said valve seat, and a stop within the larger portion of said bore at a point to prevent the withdrawal of the stem from said valve seat when the valve is pushed inward as described.

4. In an air valve for pneumatic tires, the combination with a stem made in inner and outer parts whereof the inner part is externally threaded at its outer end and the outer part is internally threaded to fit the threads of the inner part and shouldered beyond its threads to rest against the extremity of the inner part, the outer part having an internal valve seat opposite said shoulder; of an extension on the outer part rising from said shoulder, and a soft valve having a stem projecting into said extension and a conical head adapted to close against said seat.

5. In an air valve for pneumatic tires, the combination with a stem made in inner and outer parts whereof the inner is externally threaded at its outer end and the outer is internally threaded to fit the threads of the inner and shouldered beyond its threads to rest against the extremity of the inner part, the outer part having an internal valve seat opposite said shoulder; a conical valve of soft material whose body is adapted to close into said seat and whose inner end is slidably mounted within the bore of the inner part and of greater circumference than any portion of the seat.

6. An air valve for pneumatic tires comprising a two part stem whose inner part has a shoulder near its outer end and is externally threaded inside and outside of the shoulder, the outer part having an internal shoulder adapted to rest on the extremity of the inner part and a valve seat opposite such shoulder, and its body being internally and externally threaded, all threads being of the same pitch and adapted to receive a thimble when the parts are screwed together and a valve within the inner part, for the purpose set forth.

In testimony whereof I have hereunto set my hand in presence of two subscribing witnesses.

FRANK P. ROOT.

Witnesses:
J. A. ARBOGOST,
CLARENCE W. MAY.